(12) United States Patent
Kober

(10) Patent No.: US 6,276,985 B1
(45) Date of Patent: Aug. 21, 2001

(54) GYROSCOPIC MOTION DEVICE

(76) Inventor: Howard M. Kober, 29273 S. Dryland Rd., Canby, OR (US) 97013

(*) Notice: Subject to any disclaimer, the term of this patent is extended or adjusted under 35 U.S.C. 154(b) by 0 days.

(21) Appl. No.: 09/788,124

(22) Filed: Feb. 16, 2001

(51) Int. Cl.[7] .............................. A63H 1/00; A63H 1/20; B62D 51/06; G01C 19/02; B62M 29/00
(52) U.S. Cl. .................. 446/234; 446/233; 446/353; 180/187; 180/8.5; 180/8.6; 74/5.22; 74/5.34
(58) Field of Search .................. 180/187, 8.6, 8.5, 180/8.1; 446/234, 233, 353, 355; 74/5.22, 5.34

(56) References Cited

U.S. PATENT DOCUMENTS

| | | | |
|---|---|---|---|
| 2,148,374 | * | 2/1939 | Hogan .................................. 446/234 |
| 2,173,031 | * | 9/1939 | Wigal .................................. 446/234 |
| 2,736,132 | * | 2/1956 | Murray ................................. 446/234 |
| 4,365,437 | | 12/1982 | Jameson . |

FOREIGN PATENT DOCUMENTS

| | | |
|---|---|---|
| 201-626A | 11/1986 | (EP) . |
| 113573 | 5/1986 | (JP) . |

* cited by examiner

*Primary Examiner*—Brian L. Johnson
*Assistant Examiner*—Matthew Luby
(74) *Attorney, Agent, or Firm*—B. Anna McCoy; Kolisch Hartwell Dickinson McCormack & Heuser

(57) ABSTRACT

A gyroscopic motion device constructed for relative motion over an external support structure. The device includes a frame structure configured to support a pair of spaced apart gyroscopes. The device also includes a substructure operatively interposed the pair of gyroscopes which initiates a precessing effect, which results in a change in the angular disposition of the axes of rotation of the gyroscopes to cause the device to move relative to the external support structure.

22 Claims, 3 Drawing Sheets

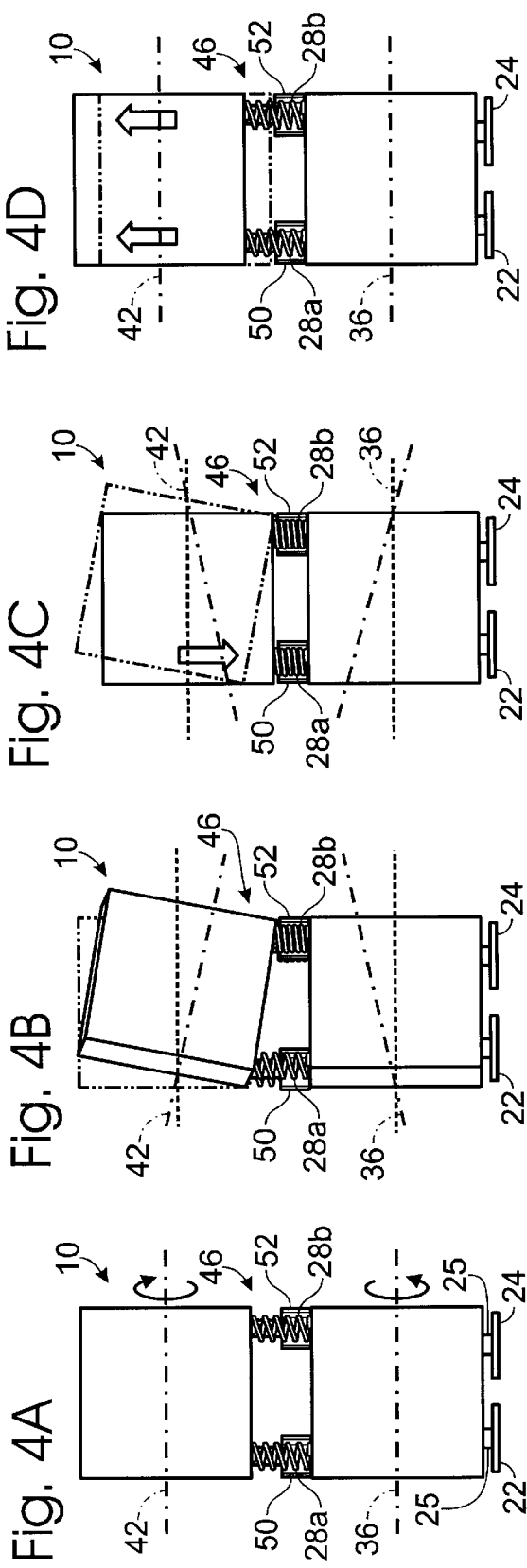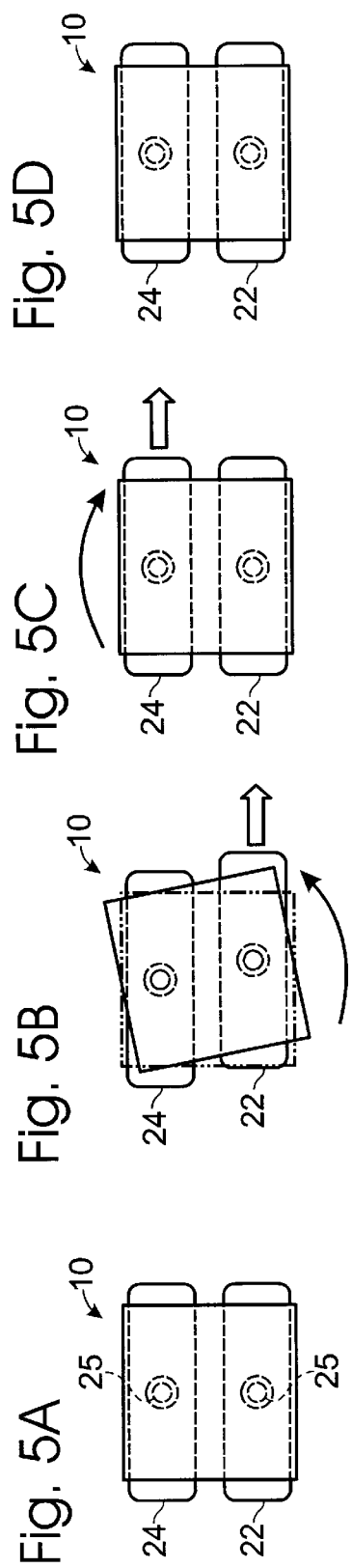

GYROSCOPIC MOTION DEVICE

FIELD OF THE INVENTION

The present invention relates generally to the field of gyroscopic motion devices, and more particularly, to a gyroscopic device which performs translational motion.

BACKGROUND OF THE INVENTION

Gyroscopes include broadly any device that contains a rapidly spinning wheel, which is mounted on the device such that the wheel may freely rotate. Gyroscopes tend to maintain their orientation, making them useful in many modern applications, including navigational systems, steering mechanisms, such as those used in auto pilot devices and compasses used on aircraft and ships, stabilizers and ship anti-roll devices.

Gyroscopes have also been used to produce motion. For example, one type of device that incorporates gyroscopes to effect motion is walking toys. The known gyroscopic walking toys are devices that use a single gyroscope where the gyroscope acts to stabilize the toy as it moves across a supporting surface. Gyroscopic effects, including precessional motion, result in a reciprocating walking behavior where the device alternatively lifts each foot as the single gyroscope precesses about the planted foot.

However, these known walking toys are very lightweight devices. A heavier device may prevent the device from effectively moving forward since the gyroscopic effect may not be large enough to overcome the weight of the device. In addition, the overall size of the known devices may be limited. An increase in the size of toys, would not only increase the weight, but would likely decrease the stability of the toys, and thereby, prevent the forward walking behavior of the toys.

An objective of this invention is to provide a motion device incorporating gyroscopes that results in motion of a non-lightweight, sizeable structure across a surface. The device may incorporate a walking or shuffling motion and should be stable during motion.

SUMMARY OF THE INVENTION

The present invention provides a gyroscopic motion device constructed for relative motion over an external support structure. The device includes a frame structure configured to support a pair of spaced apart power-driven gyroscopes. The gyroscopes are positioned generally vertically in the frame structure and have generally parallel axes of rotation. The device also includes a substructure operatively interposed the pair of gyroscopes which is selectively actuable to initiate a precessing effect in the gyroscopes. This precessing effect results in a change in the angular disposition of the axes of rotation of the gyroscopes, which causes the angular rotation of the frame structure to effect the device to move relative to the external support structure.

BRIEF DESCRIPTION OF THE DRAWINGS

FIGS. 4A–D is a series of schematic front views of the motion device of FIG. 1 in operation.

FIGS. 5A–D is a series of schematic overhead views of the motion device of FIG. 1 showing the successive motion of the feet as the motion device progresses as shown in FIGS. 4A–D.

DETAILED DESCRIPTION AND BEST MODE

Figure 1:
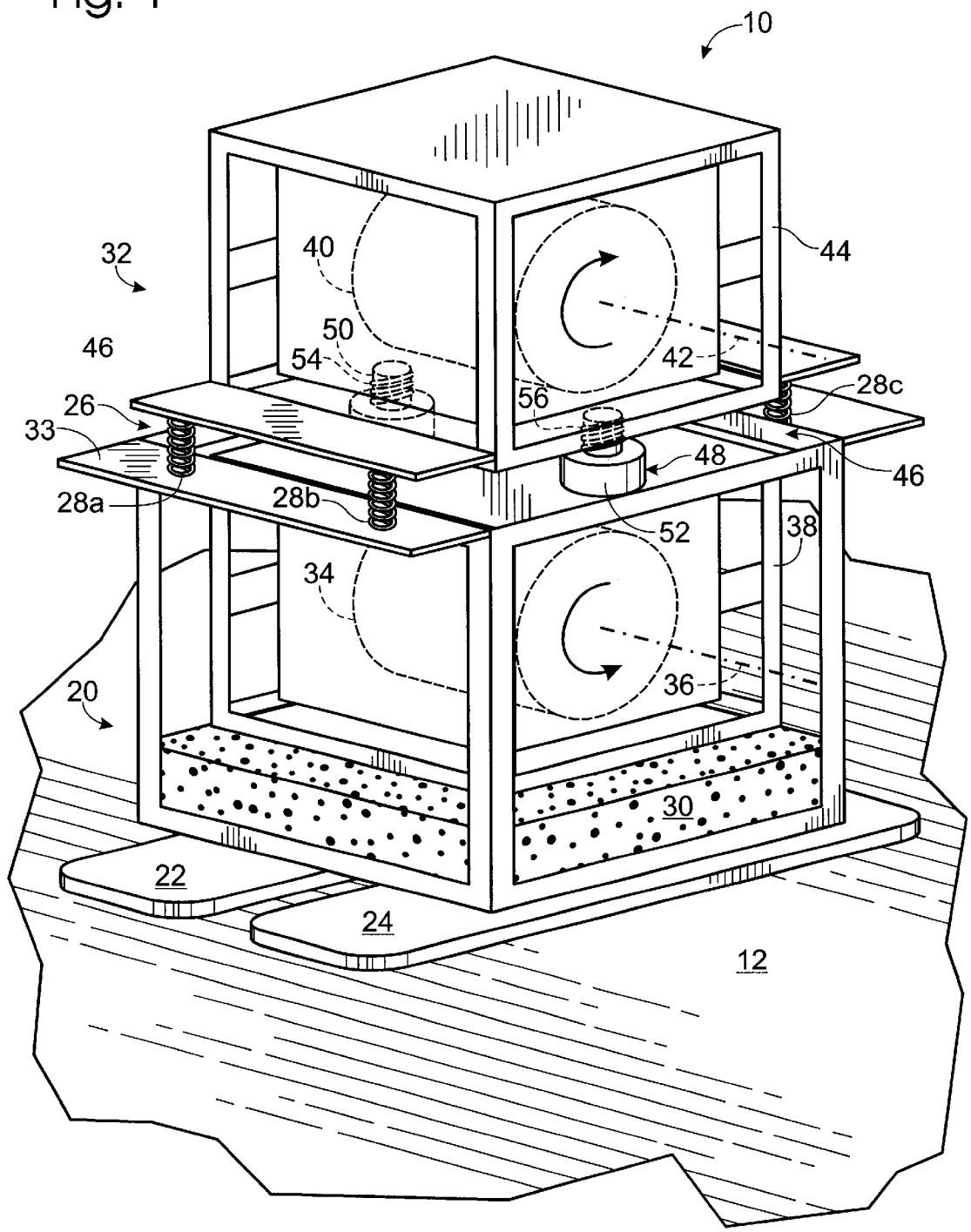
FIG. 1 is an isometric view of a translational motion device as constructed in accordance with the present invention.

A motion device constructed according to the present invention is indicated generally at 10 in FIG. 1. Device 10 is configured for relative motion over an external reference surface. For example, as shown in FIG. 1, device 10 is adapted for translational motion over ground surface 12.

Ground surface 12, as shown in the exemplary embodiment, may be any relatively flat surface. For example, surface 12 may be a table or floor. Moreover, surface 12 may be inclined or angulated such that device 10 climbs or descends as it moves across surface 12.

Figure 2:
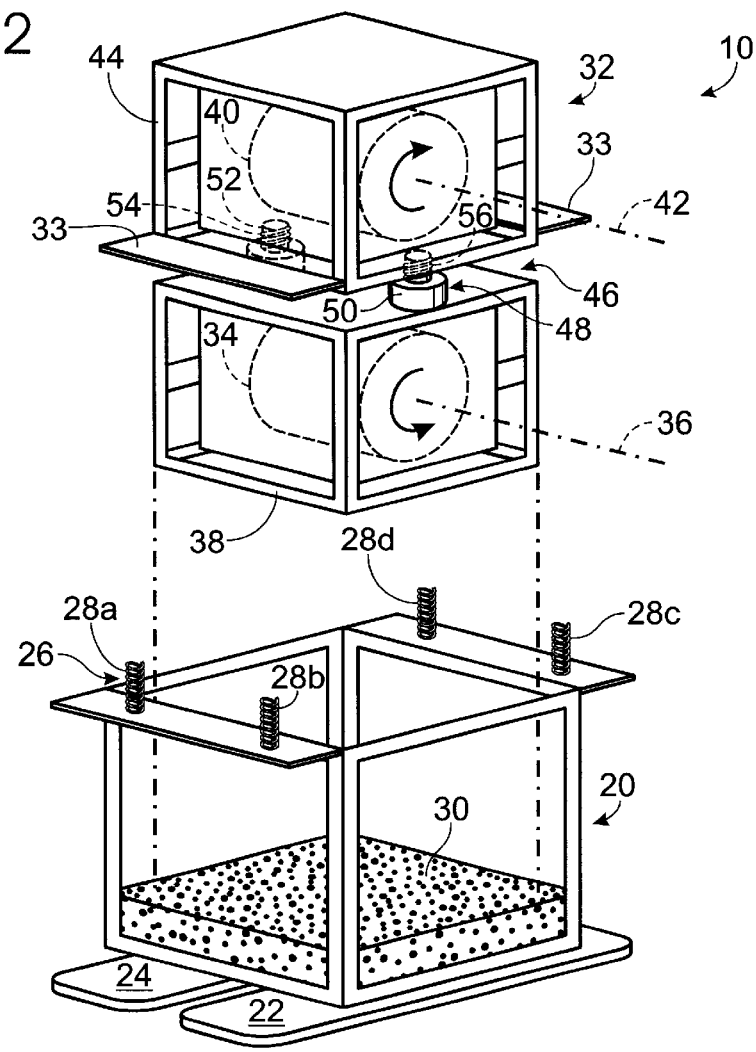
FIG. 2 is an exploded view of the motion device shown in FIG. 1 showing a gyro assembly and a frame structure as constructed in accordance with the present invention.

Device 10 includes frame structure 20. Frame structure 20, as shown in FIGS. 1 and 2, is configured to support gyro assembly 30. Frame structure 20 includes ground traveling structures or feet 22, 24, and support structure 26. As best shown in the exploded view in FIG. 2, frame structure 20 is generally box-shaped. However, other shapes are contemplated and are within the scope of the invention.

The size of frame 20 in the exemplary embodiments is dependent on the size of gyro assembly 30 that frame structure 20 supports. Additionally, although not shown, frame structure 20 may include additional features that make device 10 aesthetically attractive. Frame structure 20 may be constructed of any suitable material, including, but not limited to, metal, plastic, wood, etc.

Figure 3:
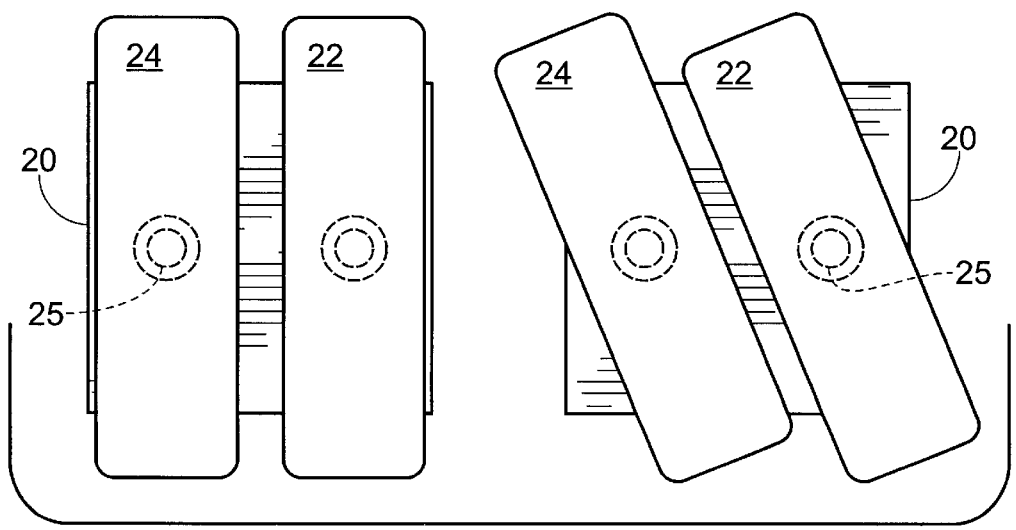
FIG. 3 is a view from below of the motion device shown in FIG. 1 showing freely rotatable feet in a first position and a rotated position.

Feet 22, 24 are shown as flat paddle feet in the illustrated embodiments (FIGS. 1–3). The feet are coupled to the underside of frame 20 such that they may freely rotate. As shown in FIG. 3, feet 22 and 24 are shown where they have freely rotated from a first position to a second position where both feet have been rotated together. However, when in operation, each foot rotates independently of the other foot. In other words, each foot is alternatively, either a moving foot, or a stationary foot, where the moving foot slidingly rotates against the stationary foot such that device 10 shuffles along a ground surface. Each foot is independently rotatively coupled to frame 20 with a conventional fastener 25, which permits free rotation of each foot. Feet 22 and 24 when placed on ground surface 12 become frictionally engaged with the surface. Although flat paddle feet are shown in the illustrated embodiments, it should be appreciated that other types of feet or ground traveling structures may be used.

In the illustrated embodiment, frame structure 20 includes support structure 26, which supports gyro assembly 30. Support structure 26 as shown in the illustrated embodiment includes a plurality of springs. As shown in FIGS. 1 and 2, four generally corner-positioned coil splings, 28a, 28b, 28c, and 28d are coupled to frame structure 20. However, alternatively any type of compression device or material, such as for example, foam may be used.

Gyro assembly 32, as shown in the exemplary embodiments, is an independent sub-assembly, which rests within frame structure 20. Gyro assembly 32 is suspended within frame 20 by support structure 26. For example, in the illustrated embodiment, shown in FIGS. 1 and 2, gyro assembly 32 includes a projection 33, which extends from the mid-region of the front and rear of gyro assembly 32. Projection 33 rests on support structure 26, shown as springs 28a, 28b, 28c, and 28d in FIGS. 1 and 2. Springs 28a, 28b, 28c, and 28d suspend gyro assembly 32 within frame structure 20. Although not shown, projection 33 may extend around all sides of gyro assembly 32. Projection 33 may be constructed of any suitable material, such as plastic or wood, which has the strength to support the weight of gyro assembly 32. Alternatively, it is within the scope of the invention, that projection 33 be shaped differently. For example, projection 33 may include four separate projections each extending outwards to one of springs 28a, 28b, 28c, and 28d.

Gyro assembly 32 may also be supported by a secondary support or reinforcement within frame structure 20. This second support or reinforcement must be elastic enough to permit gyro assembly to rock within frame structure 20. For example, as shown in FIGS. 1 and 2, reinforcement 30 is disposed on the inside base of frame structure 20. Gyro assembly 32 may rest reinforcement 30 when suspended from support structure 26. Reinforcement 30, as shown, is a foam material, however, other suitable materials may be used and are within the scope of the present invention. For example, reinforcement 30 could be a second set of springs, similar to springs 28a, 28b, 28c, and 28d as described above.

Gyro assembly 32 includes two gyroscopes 34 and 40. Each gyroscope is an independent, angular momentum device. Gyro 34, as shown in FIGS. 1 and 2, is positioned for rotation about a generally horizontal rotational axis 36. Gyro 34 is supported for independent rotation within a sub-frame 38. Likewise, gyro 40 is positioned for rotation about a generally horizontal rotational axis 42 and is supported for independent rotation within a sub-frame 44. Sub-frames 38 and 44 may take any shape to support gyros 34 and 40 and may be constructed of any suitable material. For example, as shown in the exemplary embodiments, sub-frames 38 and 44 may each resemble a rectangular box. Gyros 34 and 40 are coupled to the central region of each sub-frame 38 and 44.

Gyros 34 and 40 are vertically disposed on an axis (not shown) that extends upward through device 10. Additionally, gyro 34 and gyro 40 are in parallel planes such that gyro 34 is positioned below gyro 40. In other words, each gyroscope is on a generally horizontal rotational axis, which is substantially parallel to the rotational axis of the other gyroscope. As best illustrated in FIGS. 1 and 2, rotational axis 36 of gyro 34 is substantially parallel to rotational axis 42 of gyro 40.

Gyros 34 and 40 are positioned such that they are counter-rotating gyros. Hence, as shown in FIGS. 1 and 3, gyro 34 rotates counter-clockwise about rotational axis 36 while gyro 40 rotates clockwise about rotational axis 42. Alternatively, gyro 34 could rotate clockwise about rotational axis 36, while gyro 40 rotates counter-clockwise about rotational axis 42.

Gyros 34 and 40 in the exemplary embodiments are single-frame, power-driven gyros. Any conventional power source may be used to provide power to gyros 34 and 40. For example, power sources may include on-board or off-board batteries, electrical wall sockets, on-board or off-board fuel generators or any other suitable power source.

Gyro assembly 32 may be of any size suitable to support gyro 34 and 40. Depending on the size and weight of each individual gyro, device 10 may be larger or smaller than the exemplary embodiment shown. Although shown where gyros 34 and 40 are identically sized, device 10 may include variably sized gyros. Moreover, additional gyros may be incorporated within device 10.

Within gyro assembly 32, gyros 34 and 40 are spaced apart from each other. Gyro 34 is coupled to gyro 40 through an articulation structure or sub-structure 46. Articulation structure 46, also referred to as an articulated torso, includes an actuation mechanism 48. For example, as shown in FIGS. 1 and 2, articulation structure 46 includes the attachment region where sub-frame 38 supporting gyro 34 is coupled to sub-frame 44 supporting gyro 40. Articulation structure 46 allows the lateral bending of the two sub-frames 38 and 44 in response to activation of actuation mechanism 48.

Actuation mechanism 48, as shown, includes at least one solenoid. For example, as illustrated in FIGS. 1 and 2, actuation mechanism 48 of gyro assembly 32, includes two solenoids 50 and 52. Each solenoid 50 and 52 is independently actuable. As shown in FIGS. 1 and 2, solenoids 50 and 52 are disposed between sub-frame 38 and sub-frame 44. Conventional fasteners may be used to couple solenoids 50 and 52 to sub-frames 38 and 44. Solenoids 50 and 52 are shown positioned adjacent each other, however, alternative positions are within the scope of the invention. Moreover, other actuation mechanisms may be used, such as a rotary switch, electromagnets or other suitable device.

Additionally, a yielding member 54, and 56 may be disposed between solenoids 50 and 52 and sub-frames 38 and 44 to permit sub-frame 38 and sub-frame 44 to laterally bend toward each other. Yielding members 54 and 56 may include a coiled spring (as shown in FIGS. 1 and 2) or other resilient member that may be coupled between solenoids 50 and 52 and sub-frames 38 and 44.

By activating actuation mechanism 48 in articulation structure 46 of gyro assembly 32, sub-frames 38 and 44 are slightly drawn together on the side of activation. This motion results in a change in the angular disposition of the gyroscopes 34 and 40 such that gyroscopes 34 and 40 are not on a common vertical axis. This change initiates gyroscopic precession. Although the gyroscopes rotate relative to each other and to the ground surface, they are also operatively connected together within gyro assembly 32 such that they move as a unit. Therefore, the two gyroscopes are both affected by the change in angular disposition, and hence, as a unit precess, which increases the gyroscopic effect permitting device 10 to be of substantial weight and/or size. Moreover, since the gyro assembly is suspended in frame structure 20, the motion of gyro assembly 32 results in the angular rotation of frame structure 20 about a vertical axis, which is normal to the ground surface. This angular rotation of frame structure 20 is translated into translational motion of device 10 over ground surface 12.

Having observed the details of device 10, attention may now be given to the particulars of operation of device 10. FIGS. 4 and 5 show two different perspectives of translational motion of device 10. FIG. 4. is a symbolic illustration of a front view of device 10 in operation and FIG. 5 is a symbolic illustration of an overhead view of the same motion. Each figure shows the progression of device 10 as it moves relative to an external reference.

Generally, translational motion occurs over a ground surface as the gyro assembly 32 rocks within frame structure 20. The rocking motion is initiated by actuation mechanism 48 within articulation structure 46. The displacement of force within device 10 is altered slightly such that the opposing foot slides or shuffles forward as frame structure 20 rotates as a result of the precession effect of gyros 34 and 40 within the gyro assembly 32.

FIGS. 4A and 5A show device 10 in a first position. As shown in FIG. 4A, articulation structure 48 includes solenoids 50 and 52. Solenoids 50 or 52 have not been activated, nor springs 28a, 28b, 28c, and 28d compressed and device 10 is shown at a resting state. Although gyros 34 and 40 may be powered and rotating, this motion is not translated to feet 22 and 24 until activation of solenoids 50 or 52. Although the gyros are not explicitly shown in FIGS. 4 and 5, the gyroscopes' axes of rotation are symbolically illustrated in FIGS. 4A–4D at 36 and 42. Moreover, in FIG. 4A, the gyros' axes of rotation 36 and 42 are substantially parallel prior to activation of solenoids 50 or 52.

FIGS. 4B and 5B show an exaggerated view of device 10 after activation of solenoid 52. In particular, solenoid 52 has been triggered independently of solenoid 50 effecting the gyroscopic action of the pair of gyroscopes. The gyroscopes' axes of rotation, as shown at 36 and 42, have been altered to effect precessional motion of the gyroscopes. As a result of precessional motion caused by solenoid actuation, springs 28b (shown in FIG. 4B) and 28c (shown in FIG. 2), which are on the same side as actuated solenoid 52, are compressed. This compression results in a weight transfer such that frame structure 20 rotates about a substantially upright axis and the respective opposing foot 22 slides forward. The curved arrow in FIG. 5B represents the shuffling motion of foot 22 as it slides forward as a result of the activation of solenoid 52.

The effect of gyroscopic precession of gyro assembly 32 is that frame structure 20 (as illustrated in FIGS. 1 and 2 and described above) compensates for the change in gyroscopic action by counter-rotating. Hence, as the frame structure 20 angularly rotates, the respectively aligned foot 22 is brought forward. This shuffling motion is repeated on the opposite side when solenoid 50 is activated.

In FIGS. 4C and 5C, solenoid 50 is activated. This results in an effective change in the gyroscopic action of the pair of gyroscopes. Similar to the effect of actuation of solenoid 52, actuation of solenoid 50 results in the precessional motion of the gyroscopes as the two gyroscopes are displaced from a common vertical axis. The displacement from the common vertical axis results from activation of solenoid 50 which effects articulation structure 46 to draw sub-frames 38 and 44 together. The precessional effect of gyro assembly 32 causes the springs on the opposing side 28a (as shown in FIG. 4C) and 28c (shown in FIG. 2) to be compressed with a resultant weight change of device 10. As the weight change occurs, frame structure 20 rotates slightly and the second foot 24 slides forward, as illustrated by the curved arrow shown in FIG. 5C. The reciprocating action of the two feet, 22 and 24, allow device 10 to shuffle across a ground surface.

Finally, in FIGS. 4D and 5D, both solenoids 50 and 52 are released together. The release allows for the whole progression as shown in FIGS. 4B, 5B, 4C and 5C to be repeated. Alternatively, it is within the scope of the invention that solenoid 52 was released prior to activation of solenoid 50. Additionally, there may be additional solenoids, which could be activated and released both independently or simultaneously as other solenoids.

The activation pattern, as shown in FIGS. 4A–4D and 5A–5D, shows activation of the first solenoid, activation of the second solenoid and then simultaneous release. However, it is within the scope of the invention that different sequences of solenoid action may be used to produce different relative motion paths. For example, each solenoid may be released prior to the activation of the other solenoid.

The progression shown in FIGS. 4A–D and 5A–D illustrates device 10 moving in a forward direction. However, it is within the scope of the invention, that device 10 could also move backward using an alternative activation pattern. For example, by reversing the rotation of gyros 34 and 40, motion of device 10 may be reversed or stopped.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/ or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A gyroscopic motion device constructed for relative motion over an external support structure, the apparatus comprising:
    a frame structure;
    at least a pair of spaced apart power-driven gyroscopes positioned generally vertically in the frame structure having spaced axes of rotation; and
    a substructure operatively interposed the pair of gyroscopes and selectively actuable to initiate a precessing effect in the gyroscopes which results from a change in the angular disposition of the axes of rotation of the gyroscopes, wherein the apparatus performs translational motion relative to the external support structure.

2. The device of claim 1, wherein the device comprises a pair of freely rotatable feet operatively attached to the frame structure.

3. The device of claim 2, wherein the feet on rotating shuffle reciprocally as a result of the change in the angular disposition of the axes of rotation of the pair of gyroscopes.

4. The device of claim 1, wherein the axes of rotation of the pair of gyroscopes are generally parallel.

5. The device of claim 1, wherein the gyroscopes are counter-rotating.

6. The device of claim 1, wherein the substructure comprises at least one solenoid which is adapted to be actuated to effect the change in the angular disposition of the axes of rotation of the gyroscopes.

7. The device of claim 1, wherein the substructure comprises a first solenoid and a second solenoid, wherein the first solenoid is actuated independently of the second solenoid to effect a first change in the angular disposition of the axes of rotation of the pair of gyroscopes.

8. The device of claim 7, wherein the second solenoid is adapted to be independently actuated following actuation of the first solenoid to effect a second change in the angular disposition of the axes of rotation of the pair of gyroscopes.

9. The device of claim 1, wherein the substructure comprises a yielding member adapted to enhance the change in angular disposition of the axis of rotation of the gyroscopes.

10. An apparatus constructed for translational motion over a ground surface, the apparatus comprising:
- a pair of feet positioned to advance in at least one horizontal direction along the ground surface;
- a frame structure rotatively coupled to the feet;
- at least one gyroscope suspended within the frame structure; and
- an actuation mechanism disposed within the frame structure and operatively associated with the at least one gyroscope, wherein the actuation mechanism is adapted to effect a gyroscopic action of the at least one gyroscope resulting in angular rotation of the frame about a vertical axis which is normal to the ground surface to cause the pair of feet to shuffle along the ground surface.

11. The apparatus of claim 10, further comprising a second gyroscope vertically spaced from the at least one gyroscope and operatively associated with the at least one gyroscope, wherein the at least one gyroscope and the second gyroscope counter-rotate about parallel axes.

12. The apparatus of claim 10, wherein the actuation mechanism comprises at least one solenoid.

13. The apparatus of claim 10, wherein the actuation mechanism comprises a first solenoid and a second solenoid, wherein activation of the first solenoid results in a first angular rotation of the frame to cause one of the pair of feet to advance and wherein activation of the second solenoid results in a second angular rotation of the frame to cause the other of the pair of feet to advance.

14. A motion device constructed for translational motion over a ground surface, comprising:
- a frame structure;
- a pair of vertically spaced apart displaced gyroscopes positioned in the frame structure where each gyroscope rotates about a substantially horizontal parallel axis,
- an articulated torso interposed the pair of gyroscopes and operatively connected to the pair of gyroscopes, the torso having an actuation mechanism which produces a precess effect in the pair of gyroscopes resulting in an angular change in the disposition of the axes of rotation of the gyroscopes; and
- a pair of low friction feet rotatively coupled to the frame structure and adapted to reciprocally advance over the ground surface as a result of the angular change.

15. The device of claim 14, wherein the gyroscopes are supported in a gyro assembly.

16. The device of claim 15, wherein the gyro assembly is suspended within the frame structure by a plurality of springs.

17. The device of claim 14, wherein the gyroscopes counter-rotate.

18. The device of claim 14, wherein the actuation mechanism comprises a pair of independently actuable solenoids.

19. An apparatus constructed for translational motion over a surface, the apparatus comprising:
- a frame structure positioned for motion in at least one horizontal direction;
- a first gyroscope supported within the frame structure for rotation about a first substantially horizontal axis;
- a second gyroscope positioned vertically from the first gyroscope and operatively connected to the first gyroscope, the second gyroscope positioned for rotation about a second substantially horizontal axis parallel to the first substantially horizontal axis; and
- an actuation mechanism operatively connected to the first gyroscope and the second gyroscope wherein the gyroscopic action of the first gyroscope and second gyroscope is altered to effect the displacement of force applied to one side of the frame structure to the other side of the frame structure resulting in translational motion over the ground surface.

20. The apparatus of claim 19, wherein the first gyroscope and second gyroscope are supported within a gyro assembly wherein the gyro assembly is suspended by a plurality of springs within the frame structure.

21. The apparatus of claim 19, wherein the actuation mechanism includes a first solenoid and a second solenoid, wherein each solenoid is operatively attached to both the first gyroscope and the second gyroscope, wherein the first solenoid is activated to effect the change in the displacement of force applied to the frame structure.

22. The apparatus of claim 19, wherein the apparatus further comprises a pair of feet rotatively coupled to the frame structure, wherein the feet are adapted to reciprocally rotate such that the apparatus moves over a surface as a result of the displacement of force applied to the frame structure.

* * * * *